UNITED STATES PATENT OFFICE.

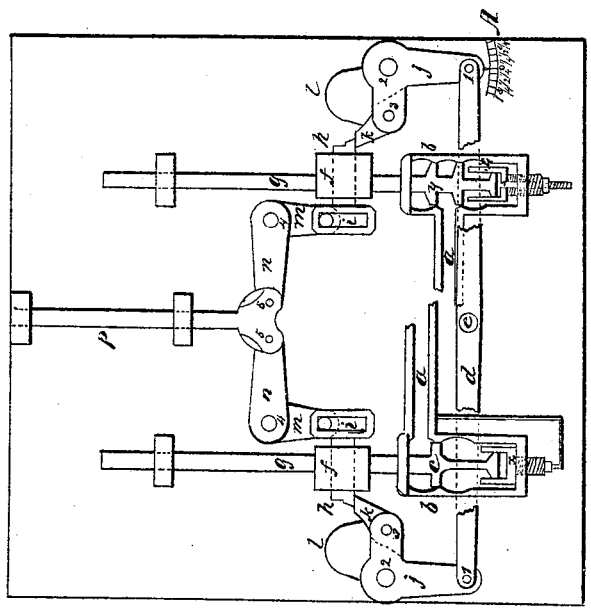
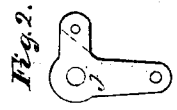
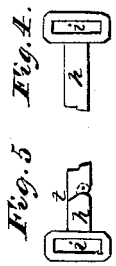

JOSEPH F. HAMILTON, OF PITTSBURG, PENNSYLVANIA.

IMPROVEMENT IN VARIABLE CUT-OFF VALVE-GEARS FOR STEAM-ENGINES.

Specification forming part of Letters Patent No. 39,229, dated July 14, 1863.

*To all whom it may concern:*

Be it known that I, JOSEPH F. HAMILTON, of Pittsburg, in the county of Allegheny and State of Pennsylvania, have invented a new and Improved Cut-Off for Steam-Engines; and I do hereby declare that the following is a full and exact description thereof, reference being had to the accompanying drawings, and to the letters of reference marked thereon.

The nature of my invention consists in operating valves of engines by means of the device hereinafter described, said device being arranged and operated so that the valves will cut off or admit steam to the cylinder in proportion to the power required of the engine.

Figure 1 is a side view of the apparatus for operating the valves, and also represents a sectional view of the valves and their chambers furnished with my improved steam-cushion. Fig. 2 represents the valve-lifter. Fig. 3 represents the trigger of the valve-lifter. Fig. 4 represents the arm used for regulating the lift of the valves. Fig. 5 represents a jointed arm which may be used for regulating the lift of the valves. Fig. 6 represents the valve-lifter and trigger combined.

In the accompanying drawings, $p$ represents a stem or rod, which I attach to the ordinary governor of the engine in any known way or manner. To the rod $p$ are attached two arms, $n$, which are attached to two arms, $m$, furnished with wrists $o$, which move in the slots $i$ of the arms $h$, which move in and out through guides $f$ on the stems $g$ of the valves $c$ and $y$.

$c$ represents a single poppet-valve, and $y$ the ordinary balance-valve.

$k$ represents the triggers of the lifters $j$, which are attached to the rock-shafts of the engine or to suitable stands made for the purpose of supporting them. The lifters are connected by means of a link, $d$, which is furnished with a wrist, $e$, to which is attached the cam-rod of the engine.

$l$ represents a spring used for holding the triggers $k$ in their proper position. The trigger and spring are also used for the purpose of allowing the lifter $j$ to assume its lifting position after it has passed the point or end of the arm $h$. It will be observed that it would be impossible for the lifter to return to its proper position after it has passed the arm $h$ without it or the arm yielding.

$b$ represents the valve-chambers.

$a$ represents the steam or supply pipe.

$x$ represents my improved steam-cushion for seating the valves.

1, 2, 3, 4, and 5 represent joints.

A represents a scale for showing at what point of the "stroke" of the engine the steam is cut off.

The form, size, and mode of constructing the stands and supports for the lifters $j$ and the stems $g$ and $p$, I leave to the taste, skill, and good judgment of the mechanic.

It will readily be observed by a skillful mechanic that the lifter $j$ may be made in one piece, as represented in Fig. 6, and the arm $h$ furnished with a joint, as represented in Fig. 5, and marked $t$, and that the result obtained thereby will be the same as that produced by the use of the trigger $k$.

The operation of my improvement is as follows: Having all things arranged and constructed as herein described and represented, I attach the cam-rod of the engine to the wrist $e$ of the link $d$, which will impart an oscillating motion to the lifters $j$, which will lift the valves alternately. The lift of the valves in all cases being in proportion to the position of the regulating-arms $h$, which are moved out toward and drawn in from the lifters $j$ by means of the arms $m$ and $n$, which are attached to the rod $p$, which is attached to the governor, the variations of which will vary the position of the regulating-arms $h$, hence the position of the arms $h$ depends on the position of the balls or flying arms of the governor—that is to say, that in proportion as the balls or flying arms are thrown out will the arms $h$ be drawn in from the lifters $j$, and in proportion to the fall of the balls or flying arms will the arms $h$ be thrown out toward the lifters $j$. Now, it will be clearly seen that the lift of the valves will be in proportion to the pressure of steam in the boiler and the labor which the engine has to perform. In other words, if the pressure of steam in the boiler is fifty pounds to the square inch, and it requires that amount of pressure to enable the engine to perform its work, then the valves will be lifted to their full extent. The engine is then said to be working "full stroke;" but if the pressure is greater than the amount required for the engine and the work it has to perform, then the lift of the valves will be lessened and the engine is then said to be "working cut-off steam."

Having thus described the nature, construction, and operation of my improvement, what I claim as of my invention is—

The arrangement of the lifters $j$, triggers $k$, spring $l$, regulating-arms $h$, arms or levers $m$ and $n$, and link $d$, when used in connection with a governor and rock-shaft or eccentric of engines, the whole being arranged, constructed, and operating substantially as herein described, and for the purpose set forth.

JOSEPH F. HAMILTON.

Witnesses:
JAMES J. JOHNSTON,
ALEXANDER HAYS.